(12) United States Patent
Rahim

(10) Patent No.: US 6,989,796 B2
(45) Date of Patent: Jan. 24, 2006

(54) ANTENNA ARRANGEMENT AND SYSTEM

(75) Inventor: Muhammad Rahim, Monroeville, PA (US)

(73) Assignee: Mobile Aspects, Pittsburgh, PA (US)

( * ) Notice: Subject to any disclaimer, the term of this patent is extended or adjusted under 35 U.S.C. 154(b) by 0 days.

(21) Appl. No.: 10/824,261

(22) Filed: Apr. 14, 2004

(65) Prior Publication Data

US 2004/0212542 A1  Oct. 28, 2004

Related U.S. Application Data

(60) Provisional application No. 60/465,477, filed on Apr. 25, 2003.

(51) Int. Cl.
*H01Q 11/12*  (2006.01)

(52) U.S. Cl. .................... 343/742; 343/867; 340/572.8

(58) Field of Classification Search ................ 343/741, 343/742, 866, 867; 340/572.7, 572.8
See application file for complete search history.

(56) References Cited

U.S. PATENT DOCUMENTS

| | | | |
|---|---|---|---|
| 5,266,922 A | 11/1993 | Smith et al. | |
| 6,263,319 B1 | 7/2001 | Leatherman | |
| 6,445,297 B1 | 9/2002 | Nicholson | |
| 6,570,541 B2 * | 5/2003 | Dettloff | 343/742 |
| 6,696,954 B2 | 2/2004 | Chung | |
| 6,720,930 B2 * | 4/2004 | Johnson et al. | 343/742 |
| 6,738,025 B2 | 5/2004 | Carrender | |
| 6,877,658 B2 * | 4/2005 | Raistrick et al. | 235/385 |
| 2003/0197653 A1 * | 10/2003 | Barber et al. | 343/742 |

* cited by examiner

*Primary Examiner*—Tho Phan
(74) *Attorney, Agent, or Firm*—The Webb Law Firm; Nathan J. Prepelka

(57) ABSTRACT

An antenna arrangement for identifying an identification element in communication with an object located in an enclosure having a "null" signal region. The antenna arrangement includes a primary antenna loop element positioned in operable communication with the enclosure and the identification element positioned within the enclosure. The primary antenna loop element communicates with the identification element and receives a signal from the identification element, thereby tracking the object associated therewith. A feed point mechanism communicates with the antenna loop element and energizes the antenna loop element, transmits signals and/or receives signals. The arrangement includes a subsequent antenna element in communication with the enclosure and the identification element positioned within the enclosure, and the subsequent antenna element substantially eliminates the signal "null" region, such that at least one of the primary loop element and the subsequent antenna element can communicate with the identification element.

37 Claims, 3 Drawing Sheets

ANTENNA ARRANGEMENT AND SYSTEM

CROSS REFERENCE TO RELATED APPLICATIONS

This application claims the benefit of U.S. Provisional Patent Application No. 60/465,477, filed Apr. 25, 2003, which is hereby incorporated by reference in its entirety.

BACKGROUND OF THE INVENTION

1. Field of the Invention

The present invention relates generally to antenna arrangements and systems in the field of signal identification, such as radio frequency identification (RF/ID) technology and, in particular, to an antenna arrangement and system for use in connection with enclosures manufactured from field-absorbing or field-reflecting materials, such as metals, semi-metals, etc., the enclosure having one or more signal "null" regions therein.

2. Description of the Related Art

Radio frequency identification (RF/ID) technology is used in many applications for both communication and identification of objects, items, inventory and the like. For example, in many inventory applications, one or more objects that a user is desirous of tracking are "tagged" or otherwise identifiable by some identification component. When using RF/ID, the tag is energized, activated or activatable, such that it emits a signal that is uniquely indicative of its identification, contents or grouping.

In order to transmit and receive signals from the tag, an antenna is typically used. The antenna can energize the tag or otherwise communicate with the tag in order to gather the appropriate identity of the object. Such systems are often used for tracking many different and varying objects or items having unique identifications or tags in operable communication with a specific object or item. In addition, it is typical that the objects or items are stored in an enclosure, such as a cabinet, a storage bin, a specified room or area or other designated and bounded area.

When using RF/ID technology, it is often preferable to maximize or enhance the radio frequency signals emanating from the antenna and the tags. Further, since the objects are located in the enclosure, it is further preferable to minimize or eliminate the radio frequency signals emanating from the enclosure, which could interfere with the operation of other RF/ID systems located adjacent or near each other. Such fields could also interfere with the operation of different pieces of equipment, such as hospital machines and equipment.

Therefore, in order to minimize and typically eliminate the undesired field emanation, the enclosure is constructed from field-absorbing materials or field-reflecting materials, such as metallic or semi-metallic materials. Using these field-absorbing or field-reflecting materials leads to other drawbacks. The main drawback of using such materials is that, due to the nature of the antenna placement and the enclosure materials of construction, one and typically multiple signal "null" or "void" regions are created by the absorption.

According to the prior art, and as illustrated in FIG. 1, a typical antenna arrangement according to the prior art may include an antenna loop element 10 having a perimeter portion 12 positioned in an enclosure 14. The perimeter portion 12 of the antenna loop element 10 is located adjacent or near a corresponding perimeter area 16 of the enclosure. The antenna loop element 10 is in communication with a feed point mechanism 18 for transmitting and receiving signals to and from the antenna loop element 10. Since the enclosure 14 is constructed from a field-absorbing material, the resulting field is non-existent in certain enclosure 14 areas, referred to signal "null" regions 20. Therefore, if an object or item (and its corresponding RF/ID tag) is located in the signal "null" region 20, the antenna arrangement and system will not "read" or identify the object. This represents a fundamental failure in the system and represents a critical error in providing an accurate inventory system.

SUMMARY OF THE INVENTION

It is, therefore, an object of the present invention to provide an antenna arrangement and system that overcomes the deficiencies in the prior art. It is another object of the present invention to provide an antenna arrangement and system for use in connection with an enclosure manufactured from a field-absorbing material. It is a further object of the present invention to provide an antenna arrangement and system that effectively eliminates the signal "null" region in the enclosure. It is a still further object of the present invention to provide an antenna arrangement and system that can accurately identify and inventory an identification element, such as a RF/ID tag, regardless of its position with respect to the antenna element.

The present invention is an antenna arrangement for use in connection with communicating with and identifying identification elements, such as RF/ID tags or labels, which are in operative communication with objects located in an enclosure, typically an enclosure manufactured from a field-absorbing material or having a shielding layer associated therewith, resulting in the enclosure having one or more signal "null" regions. The antenna arrangement includes a primary antenna loop element positioned in operable communication with the enclosure and the identification elements positioned within the enclosure. The primary antenna loop element communicates with the identification elements and receives a signal from the identification elements in order to track the object associated with the identification element.

The arrangement further includes at least one feed point mechanism in communication with the primary antenna loop element for energizing the primary antenna loop element, transmitting signals and/or receiving signals. At least one subsequent antenna element is in operable communication with the enclosure and the identification elements located within the enclosure. The subsequent antenna element substantially eliminates the signal "null" region. Accordingly, the primary antenna loop element and/or the subsequent antenna element may effectively communicate with the identification elements. In one preferred and non-limiting embodiment, the antenna arrangement includes a perimeter portion positioned adjacent a corresponding perimeter of a surface within the enclosure. The surface is typically one or more shelves positioned in the inner area of the enclosure for supporting multiple objects thereon.

The present invention, both as to its construction and its method of operation, together with the additional objects and advantages thereof, will best be understood from the following description of exemplary embodiments when read in connection with the accompanying drawings.

DETAILED DESCRIPTION OF THE PREFERRED EMBODIMENTS

Figure 1:
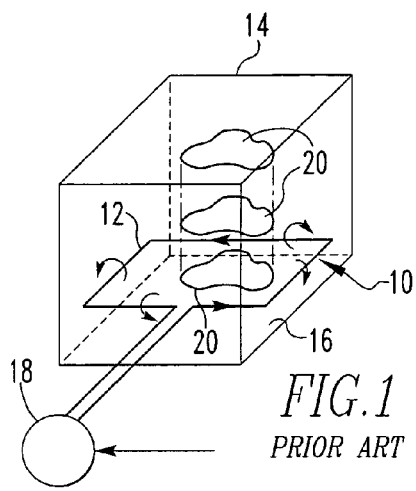
FIG. 1 is a schematic view of an antenna arrangement in an enclosure according to the prior art.

For purposes of the description hereinafter, the terms "upper", "lower", "right", "left", "vertical", "horizontal", "top", "bottom", "lateral" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

The present invention is an antenna arrangement 100 for use in connection with communicating with and identifying one or more identification elements 101, typically in the form of RF/ID tags or labels, which are, in turn, in operable communication with specified or predetermined objects 103 or items positioned or located in an enclosure 102. The antenna arrangement 100 is illustrated in various embodiments in FIGS. 2–9. As a main object, the antenna arrangement 100 is constructed, positioned, oriented and/or utilized to eliminate signal "null" regions 20 created in prior art systems. These signal "null" regions 20 are created when the enclosure 102 is constructed from a field-absorbing material, such as metal, semi-metal, etc.

The antenna arrangement 100 includes a primary antenna loop element 104 having a perimeter portion 106. The perimeter portion 106 of the primary antenna loop element 104 is typically positioned adjacent or near a corresponding perimeter area 108 of a surface 110 of the enclosure 102. Typically, the surface 110 is a platform or shelf, upon which the objects 103 or items are placed or situated. For example, the enclosure 102 may have multiple surfaces 110, each surface 110 having a respective primary antenna loop element 104 associated therewith. The primary antenna loop element 104 is used to transmit and receive signals from the identification elements 101 for use in identifying and/or taking inventory of the associated objects 103 or items. In order to pass signals to, energize or permit the primary antenna loop element 104 to emit a field, the antenna arrangement 100 also includes a feed point mechanism 112 for receiving and/or passing signals and/or current to the primary antenna loop element 104. Therefore, when the feed point mechanism 112 activates or passes signals to the primary antenna loop element 104, the primary antenna loop element 104 communicates with the identification elements 101 and receives and passes the identifying signals back through the feed point mechanism 112.

The antenna arrangement 100 includes at least one subsequent antenna element 113 in operable communication with the enclosure 102 and the identification elements 101 positioned within the enclosure 102. The subsequent antenna element 113 is configured to substantially eliminate the signal "null" regions 20, such that at least one of the primary antenna loop element 104 and/or the subsequent antenna element 113 can communicate with the identification element 101. Further, the feed point mechanism 112 may also receive, process, or transmit signals and/or energize the subsequent antenna element 113.

Figure 2:
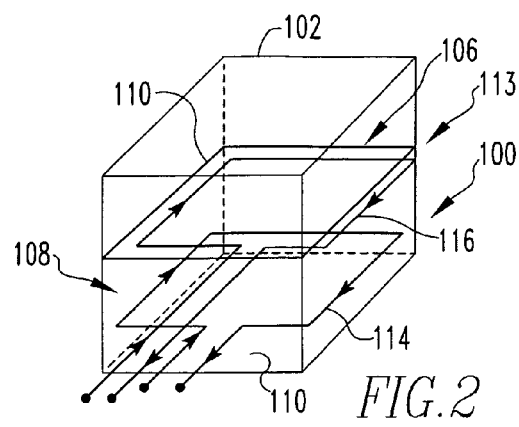
FIG. 2 is a schematic view of a preferred embodiment of an antenna arrangement in an enclosure according to the present invention.

In a preferred and non-limiting embodiment, as illustrated in FIG. 2, the antenna arrangement 100 includes the primary antenna loop element 104, in the form of a first antenna loop element 114, and the subsequent antenna element is a subsequent antenna loop element, in the form of a second antenna loop element 116. The second antenna loop element 116 is positioned vertically above and spaced from the first antenna loop element 114. Further, the first antenna loop 114 and the second antenna loop 116 are substantially aligned in a parallel relationship on separate, but parallel, planes. Still further, the direction of current that flows through both the first antenna loop 114 and the second antenna loop 116 are identical, which causes an additive and cumulative effect by the resultant field. Therefore, the orientation, positioning and current flow direction provide a greater field range and minimize the signal "null" regions 20.

It is envisioned that both the first antenna loop 114 and the second antenna loop 116 are positioned on or adjacent at separate surface 110 of the enclosure 104. For example, each separate surface can be a shelf, a bin, a storage area, etc. Additionally, the surfaces 110 may be substantially parallel and aligned, so as to properly orient the first antenna loop 114 and the second antenna loop 116.

Figure 3:
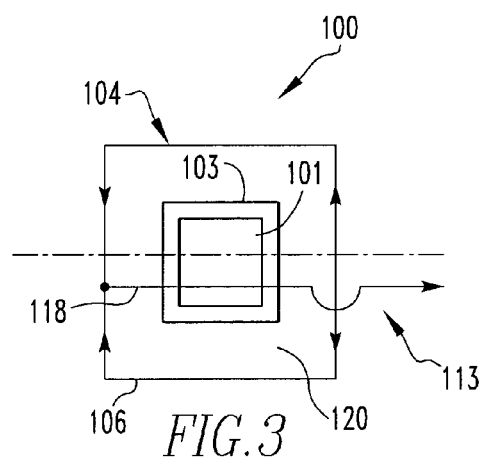
FIG. 3 is a schematic view of another preferred embodiment of an antenna arrangement according to the present invention.

In a second preferred and non-limiting embodiment, the primary antenna loop element 104 includes the subsequent antenna element 113 in the form of an inner antenna element 118 extending within an inner area 120 of the primary antenna loop element 104 and communicating therewith. As seen in FIG. 3, the current and/or signal flows from the feed point mechanism 112 through the primary antenna loop element 104 and back through the inner antenna element 118. The use of the inner antenna element 118 extending through the inner area 120 minimizes the signal "null" regions 20 by allowing the primary antenna loop element 104 to read objects 103 with identification elements 101 (RF/ID tags) that are positioned near a central portion of the inner area 120.

However, in this embodiment, if the inner antenna element 118 is centered within or bisecting the primary antenna loop element 104, it is possible that an object 103, and more specifically the associated identification element 101, could be positioned such that it could not be read or identified. For example, if the identification element 101 or RF/ID tag was straddling the inner antenna element 118, the primary antenna loop element 104 would not be able to "pick up" or read the tag for inventory purposes. Accordingly, the inner antenna element 118 can be off-set from the centerline or bisecting line of the primary antenna loop element 104, which would then, in turn, allow the primary antenna loop element 104 to "pick up" or read the identification element 101 if it was placed centrally with respect to the inner area 120 of the primary antenna loop element 104.

Figure 4:
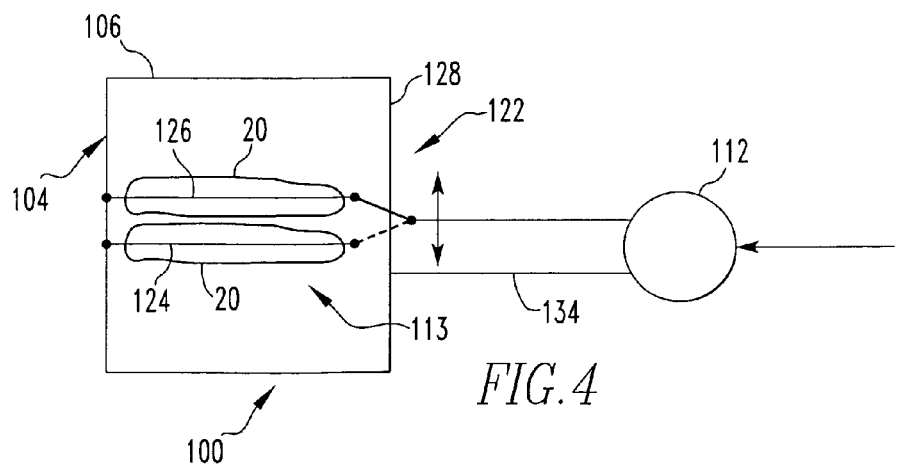
FIG. 4 is a schematic view of a further preferred embodiment of an antenna arrangement according to the present invention.
Figure 5:
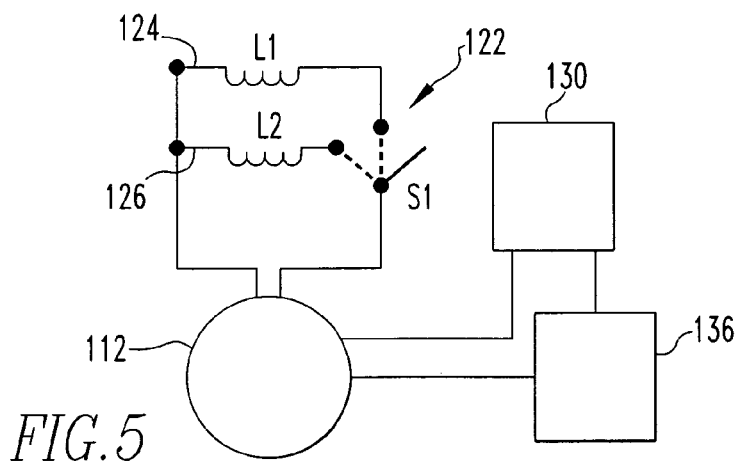
FIG. 5 is an electrical schematic view of the antenna arrangement of FIG. 4.
Figure 6:
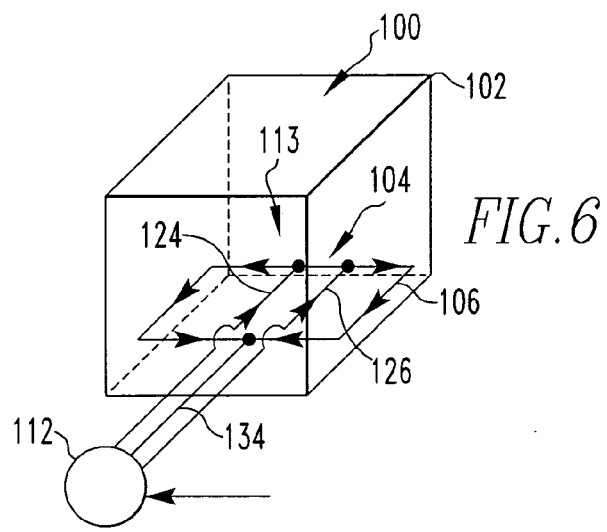
FIG. 6 is a schematic view of the antenna arrangement of FIG. 4 in an enclosure.
Figure 7:
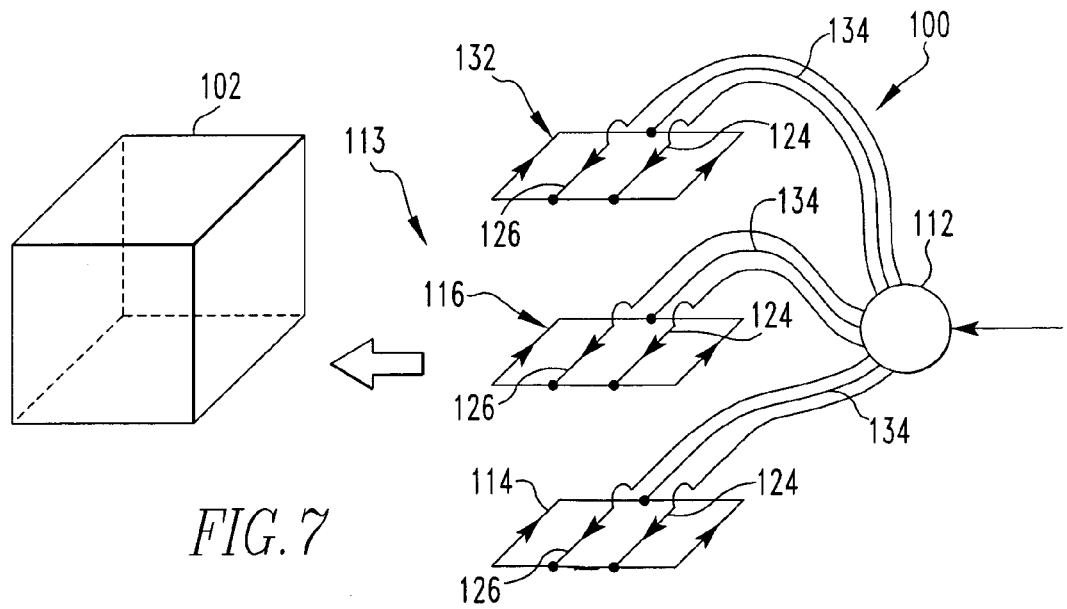
FIG. 7 is a schematic view of a further embodiment of an antenna arrangement for an enclosure according to the present invention.

In yet another preferred and non-limiting embodiment, as illustrated in FIGS. 4–6, the antenna arrangement 100 may also include a switch mechanism 122 and the subsequent antenna element 113 may take the form of a first inner antenna element 124 and a second inner antenna element 126. The feed point mechanism 112 passes current to the switch mechanism 122, which is operable to switch a lead 128 between the first inner antenna element 124 and the second inner antenna element 126. In this embodiment, the antenna arrangement 110 is such that the signals and current runs through the first inner antenna element 124 and the second inner antenna element 126 alternatively, such that the signal "null" regions 20 immediately above and around the first inner antenna element 124 will be extinguished when the second inner antenna element 126 is "switched to" or activated and vice versa. This switching functionality effectively removes the individual signal "null" regions 20 associated with each currently-active inner antenna element (124, 126). Therefore, regardless of the positioning of the identification element 101 and the corresponding object 103, the identification element 101 will be sensed or read by at least one of the inner antenna elements (124, 126).

It is further envisioned that the switching mechanism 122 is controlled by a control mechanism 130, such as a personal computing device, a printed circuit board, a software program, a control program, a personal computer, a laptop, a personal digital assistant, a networked device, a server and/or other input and control instructions. Further, this control mechanism 130 could also be in communication with and control the feed point mechanism 112 or other component of the system. The switching functionality, as controlled by the control mechanism 130, can be formula based, static, dynamic, synchronized, user-defined, intelligent, etc. For example, the control mechanism 130 may "learn" the best and most effective timing and sequence for switching between the inner antenna elements (124, 126) through trial-and-error and experience. Also, the switching functionality can be defined by and controlled indirectly by a user through the control mechanism 130. If more than one antenna loop element (104, 114, 116) is used, as discussed above in connection with the previous embodiment, the switching functionality of each respective antenna loop element (104, 114, 116) can be synchronized such that the group switches substantially simultaneously.

In another preferred and non-limiting embodiment, the antenna arrangement 100 includes a primary antenna loop element 104, in the form of a first antenna loop element 114, and a subsequent antenna element 113, in the form of a second antenna loop element 116 and a third antenna loop element 132, positioned in a stacked or vertically spaced orientation. Each of the first antenna loop element 114, the second antenna loop element 116 and the third antenna loop element 132 include the switching first inner antenna element 124 and second inner antenna element 126. Further, the first antenna loop element 114, the second antenna loop element 116 and the third antenna loop element 132 are placed in the enclosure 104 adjacent or on a separate surface 110. Each antenna loop element (114, 116, 132) can also include a ground lead 134 for grounding purposes.

Figure 8:
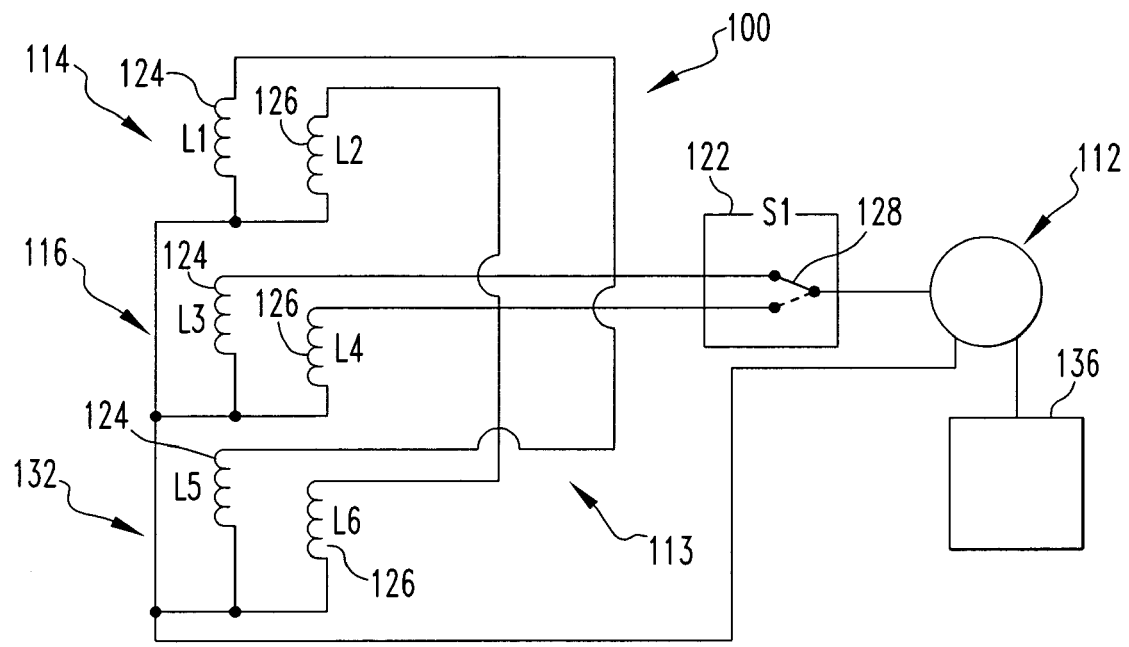
FIG. 8 is an electrical schematic view of the antenna arrangement of FIG. 7.

As illustrated in FIG. 8, a single switching mechanism 122 may operate parallel and communicating inner antenna elements (124, 126) for the first antenna loop element 114, the second antenna loop element 116 and the third antenna loop element 132. This would provide for synchronized switching for each respective antenna loop element (114, 116, 132). Also, as shown in FIG. 8, the feed point mechanism 112 can be in communication with a signal reader 136 for collecting, processing and transmitting the "read" or collecting signals emanated by the antenna loop elements (114, 116, 132). Such signal readers 136 are known in the art, and, additionally, the signal reader 136 may be in communication with and controlled by the control mechanism 130.

Figure 9:
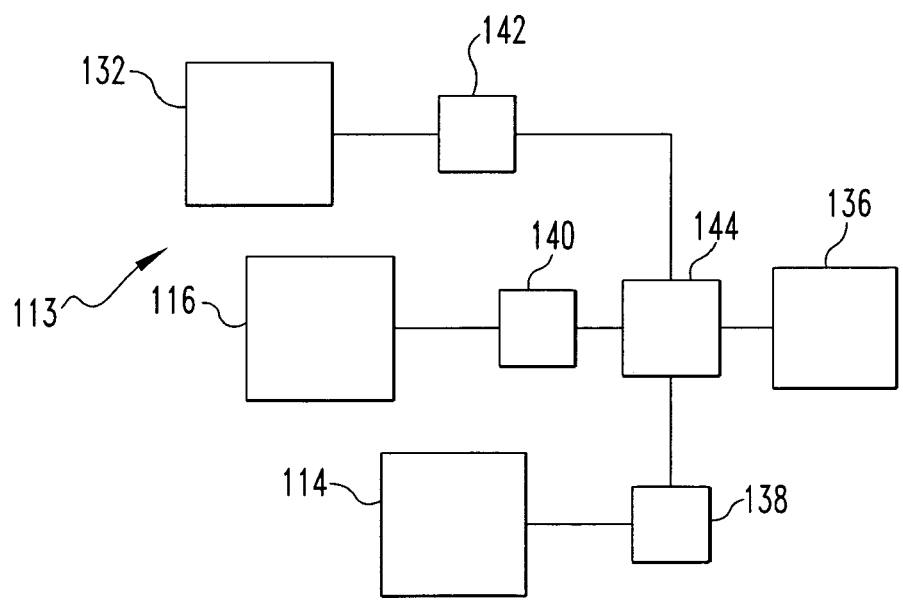
FIG. 9 is a schematic view of a further embodiment of an antenna arrangement according to the present invention.

In a further preferred and non-limiting embodiment, as illustrated in FIG. 9, each of the first antenna loop element 114, the second antenna loop element 116 and the third antenna loop element 132 may be in communication with a respective first feed point mechanism 138, second feed point mechanism 140 and third feed point mechanism 142. All the feed point mechanisms (138, 140, 142) are in communication with and pass signals to a multiplexor mechanism 144, which is able to receive, process and transmit multiple inputs and provide a desired output to, for example, the signal reader 136. As with the signal reader 136, the multiplexor mechanism 144 may be in communication with and controlled by the control mechanism 130.

The antenna arrangement 100 may also include components for matching and tuning or otherwise manipulate the characteristics of the antenna. Since most radio frequency transmitters and receivers have an internal impedance of 50 ohms, in order to obtain the maximum transmitted and received power, the impedance of the antenna must match that of the transmitter and receiver. The antenna design does not usually have an impedance of exactly 50 ohms. Therefore, an impedance matching or tuning network is inserted between the antenna and the transmitter/receiver. This network communicates and modifies the characteristics of the antenna so that the transmitter/receiver "sees" an impedance of 50 ohms, and the maximum power is transferred to or from the antenna.

Any number of subsequent antenna elements, such as antenna loop elements (104, 114, 116, 132), are envisioned. Using the antenna arrangement 100 as described above, the signal "null" regions 20 are minimized or eliminated, which vastly improves the accuracy of an inventory or control system. The antenna arrangement 100 is particularly adapted for use in connection with an enclosure manufactured from a field-absorbing material. Further, the antenna arrangement 100 of the present invention accurately identifies and "reads" an RF/ID tag regardless of its position and orientation in the enclosure 102. In addition, the antenna arrangement 100 of the present invention is useful in a hospital or medical setting, wherein the enclosure 102 is usually shielded to prevent signals from emanating from the enclosure 102. The identification element 101 is affixed to each object 103 and emits a signal unique to the identity of the corresponding object 103. For example, the object 103 may be a medical item, such as a container of medicine or a medical device.

This invention has been described with reference to the preferred embodiments. Obvious modifications and alterations will occur to others upon reading and understanding the preceding detailed description. It is intended that the invention be construed as including all such modifications and alterations.

What is claimed is:

1. An antenna arrangement for use in connection with communicating with and identifying at least one identification element in operable communication with at least one object located in an enclosure having at least one "null" signal region, the antenna arrangement comprising:

a primary antenna loop element positioned in operable communication with the enclosure and the at least one identification element positioned within the enclosure, the primary antenna loop element configured to communicate with the at least one identification element and receive a signal from the at least one identification element, thereby tracking the at least one object associated therewith;

at least one feed point mechanism in communication with the primary antenna loop element and configured to at least one of energize the primary antenna loop element, transmit signals and receive signals; and at least one subsequent antenna element in operable communication with the enclosure and the at least one identification element positioned within the enclosure, the at least one subsequent antenna element configured to substantially eliminate the signal "null" region, such that at least one of the primary loop element and the subsequent antenna element can communicate with the identification element;

wherein the subsequent antenna element is at least one subsequent antenna loop element positioned in a spaced relationship with the primary antenna loop element;

wherein the at least one subsequent antenna loop element is vertically spaced from and substantially in alignment with the primary antenna loop element.

2. The antenna arrangement of claim 1, wherein the primary antenna loop element further comprises a perimeter portion positioned substantially adjacent a corresponding perimeter are of a surface of the enclosure.

3. The antenna arrangement of claim 1, wherein the enclosure further comprises at least one surface positioned therein.

4. The antenna arrangement of claim 3, wherein the surface acts as a shelf and supports the at least one object thereon.

5. The antenna arrangement of claim 1, wherein the directional flow of current through the at least one subsequent antenna loop element and the primary antenna loop element are identical, thereby yielding a cumulative field effect.

6. The antenna arrangement of claim 1, wherein the primary antenna loop element at the at least one subsequent loop arrangement are positioned substantially adjacent a respective surface within the enclosure.

7. The antenna arrangement of claim 1, wherein the subsequent antenna element is a plurality of inner antenna elements extending within an inner area of the primary antenna loop element and in operable communication with the primary antenna loop element.

8. The antenna arrangement of claim 7, further comprising a switch mechanism in communication with the feed point mechanism and having at least one lead switchable between the plurality of inner antenna elements, such that at least one of the inner antenna elements are selectively powered by the feed point mechanism via the lead of the switching mechanism.

9. The antenna arrangement of claim 8, wherein the switching mechanism is in communication with and controllable by a control mechanism configured to control at least one of the switching timing and switching sequence.

10. The antenna arrangement of claim 9, wherein the control mechanism is at least one of computing device, a printed circuit board, a software program, a control program, a personal computer, a laptop, a personal digital assistant, a networked device and a server.

11. The antenna arrangement of claim 9, wherein at least one of the switching timing and switching sequence are formula based, static, dynamic, synchronized, user-defined and intelligent.

12. The antenna arrangement of claim 7, wherein the feed point mechanism provides current to at least one of the plurality of inner antenna elements, the current flows through the at least one of the plurality of inner antenna elements and further through the primary antenna loop element.

13. The antenna arrangement of claim 7, wherein at least one of the plurality of inner antenna elements substantially bisects the primary antenna loop element.

14. The antenna arrangement of claim 7, wherein at least one of the plurality of inner antenna elements is offset with respect to an axis substantially bisecting the primary antenna loop element.

15. The antenna arrangement of claim 1, further comprising a signal reader in communication with the feed point mechanism and configured to at least one of receive, process and transmit signals with respect to at least one of the primary antenna loop element and the subsequent antenna element.

16. The antenna arrangement of claim 1, further comprising a plurality of feed point mechanisms in communication with a multiplexor mechanism configured to at least one of receive, process and transmit signals.

17. The antenna arrangement of claim 16, further comprising a control mechanism in communication with the multiplexor mechanism and configured to control the functioning of the multiplexor mechanism.

18. The antenna arrangement of claim 1, further comprising a tuning mechanism in communication with at least one of the primary antenna loop element and the subsequent antenna element and configured to at least one of match, tune and manipulate the characteristics of the primary antenna loop element and the subsequent antenna element.

19. The antenna arrangement of claim 1, wherein the identification element is at least one of a tag and a label affixed to each object and configured to emit a unique signal corresponding the identity of the object.

20. The antenna arrangement of claim 1, wherein the at least one object is a medical item.

21. The antenna arrangement of claim 20, wherein the medical item is at least one of a container of medicine and a medical device.

22. An antenna arrangement for use in connection with communicating with and identifying at least one identification element in operable communication with at least one object located in an enclosure having at least one "null" signal region, the antenna arrangement comprising:

a primary antenna loop element positioned in operable communication with the enclosure and the at least one identification element positioned within the enclosure, the primary antenna loop element configured to communicate with the at least one identification element and receive a signal from the at least one identification element, thereby tracking the at least one object associated therewith;

at least one feed point mechanism in communication with the primary antenna loop element and configured to at least one of energize the primary antenna loop element, transmit signals and receive signals; and at least one subsequent antenna element in operable communication with the enclosure and the at least one identification element positioned within the enclosure, the at least one subsequent antenna element configured to substantially eliminate the signal "null" region, such that at least one of the primary loop element and the subsequent antenna element can communicate with the identification element;

wherein the subsequent antenna element is an inner antenna element extending within an inner area of the primary antenna loop element and in operable communication with the primary antenna loop element.

23. The antenna arrangement of claim 22, wherein the feed point mechanism provides current to the primary antenna loop element, the current flows through the primary antenna loop element and further through the inner antenna element.

24. The antenna arrangement of claim 22, wherein the inner antenna element substantially bisects the primary antenna loop element.

25. The antenna arrangement of claim 22, wherein the inner antenna element is offset with respect to an axis substantially bisecting the primary antenna loop element.

26. An antenna arrangement for use in connection with communicating with and identifying at least one identification element in operable communication with at least one object located in an enclosure having at least one "null" signal region, the antenna arrangement comprising:
   a primary antenna loop element positioned in operable communication with the enclosure and the at least one identification element positioned within the enclosure, the primary antenna loop element configured to communicate with the at least one identification element and receive a signal from the at least one identification element, thereby tracking the at least one object associated therewith;
   at least one feed point mechanism in communication with the primary antenna loop element and configured to at least one of energize the primary antenna loop element, transmit signals and receive signals; and
   at least one subsequent antenna element in operable communication with the enclosure and the at least one identification element positioned within the enclosure, the at least one subsequent antenna element configured to substantially eliminate the signal "null" region, such that at least one of the primary loop element and the subsequent antenna element can communicate with the identification element;
   wherein the subsequent antenna element is a plurality of inner antenna elements extending within an inner area of at least one of the primary antenna loop element and at least one subsequent antenna loop element, each of the inner antenna elements in operable communication with the respective primary antenna loop element and at least one subsequent antenna loop element.

27. The antenna arrangement of claim 26, further comprising at least one switch mechanism in communication with at least one feed point mechanism and having at least one lead switchable between the plurality of inner antenna elements, such that at least one of the inner antenna elements are selectively powered by the feed point mechanism via the lead of the switching mechanism.

28. The antenna arrangement of claim 27, wherein the at least one switching mechanism is in communication with and controllable by a control mechanism configured to control at least one of the switching timing and switching sequence.

29. The antenna arrangement of claim 27, wherein at least one of the switching timing and switching sequence are formula based, static, dynamic, synchronized, user-defined and intelligent.

30. The antenna arrangement of claim 26, wherein the feed point mechanism provides current to at least one of the plurality of inner antenna elements, the current flows through the at least one of the plurality of inner antenna elements and further through the primary antenna loop element and the at least one subsequent antenna loop element.

31. The antenna arrangement of claim 26, wherein at least one of the plurality of inner antenna elements substantially bisects the respective primary antenna loop element and at least one subsequent antenna loop element.

32. The antenna arrangement of claim 26, wherein at least one of the plurality of inner antenna elements is offset with respect to an axis substantially bisecting the respective primary antenna loop element and at least one subsequent antenna loop element.

33. The antenna arrangement of claim 26, wherein the enclosure further comprises a plurality of surfaces positioned therein.

34. The antenna arrangement of claim 33, wherein at least one of the plurality of surfaces act as a shelf and supports the at least one object thereon.

35. The antenna arrangement of claim 33, wherein each respective subsequent antenna element is positioned substantially adjacent a respective one of the plurality of surfaces.

36. An antenna arrangement for use in connection with communicating with and identifying at least one identification element in operable communication with at least one object located in an enclosure having at least one "null" signal region, the antenna arrangement comprising:
   a primary antenna loop element positioned in operable communication with the enclosure and the at least one identification element positioned within the enclosure, the primary antenna loop element configured to communicate with the at least one identification element and receive a signal from the at least one identification element, thereby tracking the at least one object associated therewith;
   at least one feed point mechanism in communication with the primary antenna loop element and configured to at least one of energize the primary antenna loop element, transmit signals and receive signals;
   at least one subsequent antenna element in operable communication with the enclosure and the at least one identification element positioned within the enclosure, the at least one subsequent antenna element configured to substantially eliminate the signal "null" region, such that at least one of the primary loop element and the subsequent antenna element can communicate with the identification element;
   wherein the subsequent antenna element is at least one subsequent antenna loop element positioned in a spaced relationship with the primary antenna loop element;
   wherein the directional flow of current through the at least one subsequent antenna loop element and the primary antenna loop element are identical, thereby yielding a cumulative field effect.

37. The antenna arrangement of claim 36, wherein the at least one subsequent antenna loop element is vertically spaced from and substantially in alignment with the primary antenna loop element.

* * * * *

UNITED STATES PATENT AND TRADEMARK OFFICE
CERTIFICATE OF CORRECTION

| | | |
|---|---|---|
| PATENT NO. | : 6,989,796 B2 | Page 1 of 1 |
| APPLICATION NO. | : 10/824261 | |
| DATED | : January 24, 2006 | |
| INVENTOR(S) | : Muhammad Rahim | |

It is certified that error appears in the above-identified patent and that said Letters Patent is hereby corrected as shown below:

Column 7, line 30, Claim 2, "perimeter are of a" should read -- perimeter area of a --

Column 7, line 44, Claim 6, "element at the" should read -- element and the --

Signed and Sealed this

Twentieth Day of March, 2007

JON W. DUDAS
*Director of the United States Patent and Trademark Office*